Oct. 28, 1958      H. G. WARREN      2,858,096
FLUID PRESSURE ACTUATED GATE VALVE
Filed April 28, 1955      2 Sheets-Sheet 1
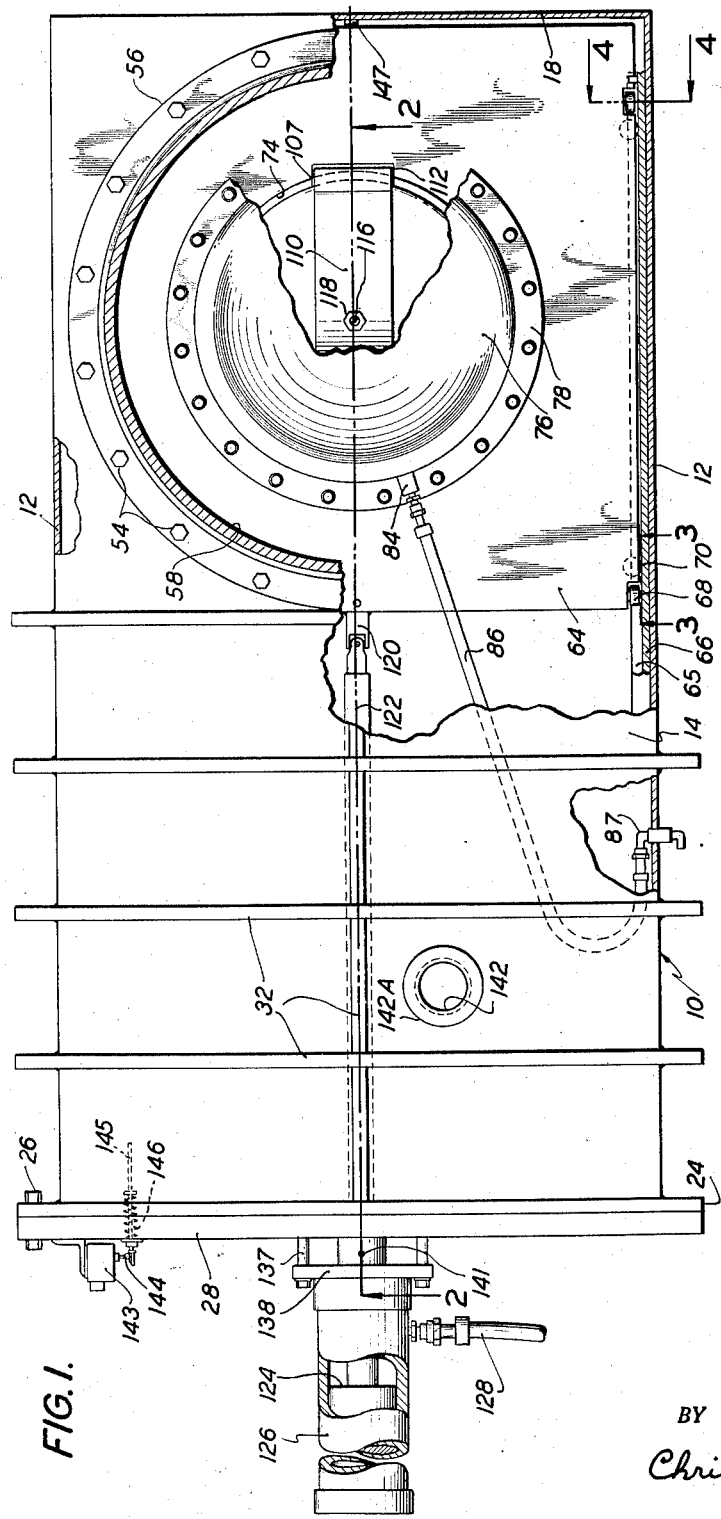
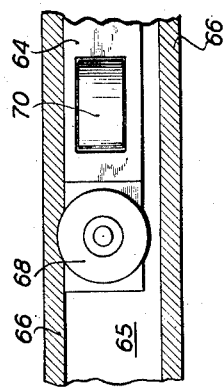
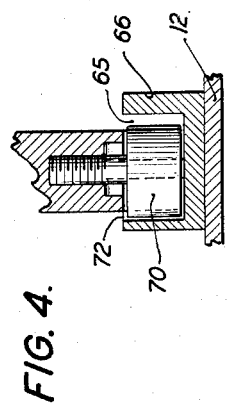
INVENTOR.
HORACE G. WARREN
BY
*Christie, Parker & Hale*
ATTORNEYS

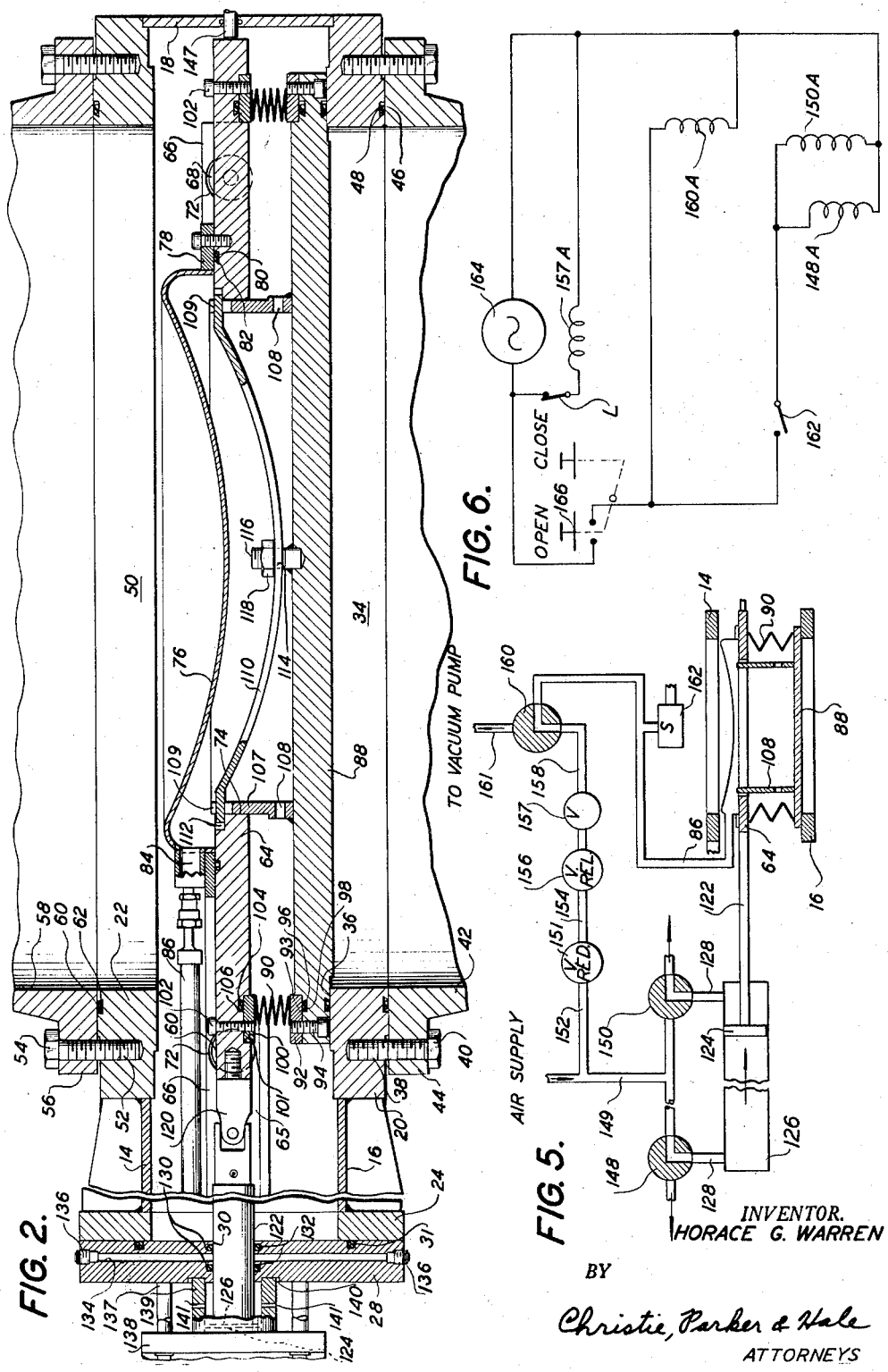

United States Patent Office 2,858,096
Patented Oct. 28, 1958

2,858,096

FLUID PRESSURE ACTUATED GATE VALVE

Horace G. Warren, Rochester, N. Y., assignor, by mesne assignments, to Consolidated Electrodynamics Corporation, Pasadena, Calif., a corporation of California Application April 28, 1955, Serial No. 504,563

3 Claims. (Cl. 251—31)

This invention relates to valves and more particularly to gate valves.

Gate valves are commonly used in installations where it is desirable or necessary to use a valve in which the valve disk may be moved clear of the valve seat to provide an unobstructed passageway straight through the valve. One disadvantage of gate valves used prior to this invention is that they are constructed so that the valve disk makes a sliding contact on the valve seat before effecting a complete seal. This results in rapid and excessive wear of the valve elements and makes positive and complete sealing of the valve uncertain.

The valve of this invention overcomes the disadvantages of prior gate valves by providing an arrangement in which the valve disk does not slide on the valve seat. In addition, the valve of the invention is readily adapted to automatic fluid actuation. Although the valve may be used for many types of operations, it is particularly well suited for use in high vacuum systems which require extremely tight seals. For example, the valve is ideally suited for use in a vacuum furnace such as that described in co-pending application Serial No. 505,632, filed May 3, 1955, which issued as Patent No. 2,825,945 on March 11, 1958, in which it is desirable to be able to pass large objects through conduits in which a vacuum valve is disposed.

Briefly, the valve comprises a body having a first opening and a second opening. A valve seat is formed around the first opening and a valve disk is attached to a member movably disposed within the body so that the valve disk may be moved either over the valve seat and spaced therefrom or moved away from and clear of the valve seat. In addition, the disk is movably attached to the member so that the disk can be moved transversely of the direction of member movement. This permits the valve disk to be moved toward and away from the valve seat to seal and unseal the first opening with the valve disk.

Preferably the valve is provided with fluid actuated means for moving the member to which the disk is attached and also for moving the disk transversely of the direction of movement of the member.

In a preferred system for operating the valve automatically the valve is supplied fluid pressure by means of solenoid actuated control valves to open or close the valve automatically.

These and other aspects of the invention will be more clearly understood from the following detailed description taken in conjunction with the accompanying drawings in which:

Fig. 1 is a plan view, partly broken away, of a presently preferred embodiment of the invention, showing the valve in its closed position;

Fig. 2 is a vertical section taken on line 2—2 of Fig. 1;

Fig. 3 is a vertical section taken on line 3—3 of Fig. 1;

Fig. 4 is a vertical section taken on line 4—4 of Fig. 1;

Fig. 5 is a schematic flow diagram showing a presently preferred system for automatic fluid actuation of the valve; and Fig. 6 is a schematic circuit diagram showing the control of the solenoid valves shown in Fig. 5.

Referring to Figs. 1 and 2, the valve comprises a relatively long and shallow rectangular body 10 having a pair of parallel side plates 12, a top plate 14, a bottom plate 16, and an end plate 18 bonded to the top, bottom and side plates at one end of the body. The bottom plate is provided with a substantially square relatively thick first reinforcing section 20 at its end adjacent end plate 18, and the top plate is provided with a similar second reinforcing section 22.

The other end of the body is open and provided with an outwardly turned flange 24 to which is secured by means of bolts 26 a cover plate 28 having a circular opening 30 in its center. An O-ring gasket 31 effects a vacuum-tight seal between the cover plate and the flange 24. Except for the first and second reinforcing sections in the top and bottom plates, the walls of the body are made of relatively thin steel plate and are reinforced by external webs 32 which are welded to the body for increased rigidity.

A relatively large, circular first opening 34 is provided in the first reinforcing plate and an annular valve seat 36 is formed on the upper surface of the first reinforcing plate around the first opening. A plurality of internally threaded bolt holes 38 are formed in the bottom surface of the first reinforcing plate around the first opening to receive bolts 40 which permit the valve to be secured to a first conduit 42 having an outwardly turned flange 44 through which the bolts are disposed. An annular groove 46 in the bottom surface of the first reinforcing plate retains an O-ring 48 which insures a vacuum-tight seal between the flange of the first conduit and the first reinforcing plate.

A relatively large, circular second opening 50 is formed in the second reinforcing plate co-linear with the first opening, the second opening having substantially the same diameter as the first. A plurality of internally threaded bolt holes 52 are formed in its upper surface to receive bolts 54 extending through a flange 56 formed on the end of a second conduit 58 which is attached to the upper side of the valve. An annular groove 60 formed in the upper surface of the second reinforcing plate retains an O-ring 62 which insures a vacuum-tight seal between the second conduit and second reinforcing plate.

A substantially square thrust plate 64 is horizontally disposed within the center of the valve body to be movable longitudinally. The thrust plate is of sufficient dimension to extend from one side plate of the body to the other and each side edge of the thrust plate is disposed within a separate guideway 65 formed by a member 66 of channel cross-section and disposed along the center line and for substantially the entire length of each side plate so that each channel opens in a horizontal direction toward the center of the valve.

Each corner of the thrust plate is provided with a first roller 68 adapted to revolve about a horizontal axis and engage the channel member 66 to provide vertical rolling support for the thrust plate as it moves in the ways. A second roller 70 is disposed adjacent each first roller to revolve about a vertical axis and engage the channel member 66 to provide a horizontal rolling support for the thrust plate as it is moved in the ways. Thus, the thrust plate is arranged to slide within the valve body from the end of the body having the first and second openings to the opposite end of the body.

Each of the guide ways is provided with a pair of separate recesses 72 opening toward the first opening (downwardly as viewed in Figs. 2 and 3) and adapted to receive each of the first rollers when the thrust plate is disposed over the first opening, that is, adjacent end plate 18. A circular opening 74 is formed in the center of the thrust plate and a circular dish-shaped cover plate 76 having an outwardly turned flange 78 is bolted to the upper surface of the thrust plate and sealed thereto by means of an O-ring 80 disposed in an annular groove 82 formed in the upper surface of the thrust plate around the opening 74. The cover plate is provided with a conduit 84 to which is connected a flexible pneumatic line 86 which extends horizontally away from end plate 18 toward the side plate 12. The flexible coupling makes a 180° turn and is connected to a nipple 87 which is sealed through side wall 12 and adapted to be connected to an air supply (not shown).

A circular valve disk 88 having a diameter slightly larger than that of the first opening is attached to the bottom of the thrust plate by means of a bellows 90 so as to be movable in a direction transverse of the direction of movement of the thrust plate. An outwardly turned flange 92 on the lower end of the bellows is secured to the upper surface of the valve disk in an annular shoulder 93 formed at the periphery of the valve disk by means of bolts 94 and sealed thereto by an O-ring 96 disposed in an annular groove 98 formed in the upper surface of the valve disk. An outwardly turned flange 100 attached to the upper end of the bellows is connected to the bottom surface of the thrust plate in an annular groove 101 formed in the bottom surface of the thrust plate by means of bolts 102 and sealed thereto by an O-ring 104 disposed in an annular groove 106 formed in the bottom surface of the thrust plate.

An upwardly extending cylindrical collar 107 is welded at its lower end to the upper surface of the valve disk and its upper end extends up through the opening 74 formed in the thrust plate. The outside diameter of the collar is only slightly less than the diameter of the opening 74 so that the collar forms a rather close sliding fit thereto to provide a guide for the valve disk. A plurality of openings 108 through the collar permit rapid evacuation and pressurizing of the bellows as described below. A pair of notches 109 are formed on diametrically opposed locations in the upper edge of the collar to permit the ends of a leaf spring 110 which extends across the opening 74 to rest on an annular shoulder 112 formed around the opening 74. The center of the leaf spring curves downwardly and is provided with a hole 114 up through which extends a lug 116 having its lower end welded to the valve disk and its upper end threaded to receive a nut 118 to hold the leaf spring down so as to urge the valve disk toward the thrust plate.

The edge of the thrust plate remote from end plate 18 is pivotally attached by means of a universal joint 120 to one end of a piston rod 122. The other end of the piston rod is slidably sealed through the opening 30 formed in the cover plate 28 and is attached to a piston 124 disposed within a pneumatic cylinder 126 having conventional connections 128 for letting compressed air in and out of the cylinder on opposite sides of the piston. The travel of the piston within the cylinder is suitably limited by any conventional means so that the thrust plate stops just short of the valve body interior at each end of its travel. The opening 30 in the cover plate has two annular grooves 130 formed therein each of which contains an O-ring 132 that seals against the piston rod. A vertical bore 134 through the cover plate provides a lubrication channel between the O-ring grooves 130 to the piston 122. The ends of the bore 134 are threaded internally to receive plugs 136. A low vapor pressure vacuum lubricant such as Convoil is used in the channel 134 to provide a lubricated vacuum seal for the piston. The cylinder is secured to the plate 28 by means of bolts 137 extending through an outwardly extending blank flange 138 on the end of the cylinder adjacent the valve body. A spacer ring 139 fits in an annular groove 140 on the exterior surface of the plate 28 around the piston and extends co-axially around the piston to space the cylinder from the valve body. A pair of vent holes 141 in the spacer ring 139 prevents any build-up of positive pressure within the spacer ring due to temperature fluctuating and thus insures that the seal around the piston is never subjected to a differential pressure greater than atmospheric.

One end of a conduit 142 is welded to the top plate 14 and the other end of the conduit has an outwardly turned flange 142A which is adapted to be connected to a vacuum system (not shown) so that the valve body and the second conduit can be evacuated even though the valve disk is closed to seal off the first conduit.

A microswitch 143 with a control contact 144 is mounted on the exterior of plate 28 so that one end of a first longitudinally movable shaft 145 sealed through the plate engages the contact. The other end of the shaft extends into the valve body and engages the thrust plate 64 when the valve is fully open (thrust plate moved to the extreme left as viewed in Figs. 1 and 2). A spring 146 urges the shaft inwardly when the thrust plate is moved from the fully open position. The microswitch 143 may be used to generate a signal to indicate when the valve is fully open. A second longitudinally movable shaft 147 is slidably sealed through end plate 18. Suitable springing means (not shown) urge the shaft 147 inwardly so that the inner end of the shaft engages the thrust plate and the shaft moved to the right (as viewed in Figs. 1 and 2) when the valve is closed. The shaft 147 is used to close a limit switch L (shown only in Fig. 6) when the thrust plate moves the shaft to the right.

For automatic operation the valve is preferably connected to a system such as that shown in Fig. 5, the low pressure side being below the valve disk. A first solenoid-operated three-way valve 148 controls the flow of air from an air supply conduit 149 into the cylinder 126 on one side of the piston 124 and a second solenoid-operated three-way valve 150 controls the flow of air from the air supply into the cylinder on the other side of the piston. A pressure reducer 151 is supplied air by a conduit 152 from the air supply conduit and in turn supplies air through a conduit 154, a pop-off valve 156, and a solenoid-operated valve 157 to another conduit 158 which is connected to a third solenoid-operated three-way valve 160 which is arranged to connect the flexible pneumatic line 86 to either the conduit 158 supply or to a vacuum pump (not shown) through a conduit 161. A pressure contact switch 162 is connected in the flexible line 86 and set to close only after a predetermined sub-atmospheric pressure is achieved within the bellows.

Fig. 6 shows schematically a circuit which is used to operate the system of Fig. 5. A conventional source of electrical power 164 is connected to supply power through an operating switch 166 to solenoid windings 148A, 150A and 160A which are connected in parallel and which operate solenoid valves 148, 150 and 160, respectively. Pressure contact switch 162 is connected serially with operating switch 166 and solenoid windings 148A and 150A. A solenoid winding 157A which operates solenoid valve 157 receives power through limit switch L which is closed when the valve is closed as shown in Fig. 2 and which opens when the thrust plate moves to the left (as viewed in Fig. 2). Valve 157 is closed when its winding is de-energized, that is, when switch L is open.

The operation of the valve can be understood more clearly from reference to Figs. 5 and 6. Assuming that the valve is in the closed position, that is, as illustrated in Figs. 1, 2 and 5 and that the valves 148, 150 and 160 are in their de-energized positions, that is, as shown in Fig. 5, and that valve 157 is energized, that is, open, the valve is opened as follows: The operating switch 166 is operated, either manually or automatically, so that the power supply is connected across the solenoid winding 160A of valve 160. This causes the flexible line 86 to be disconnected from the air supply and connected to the vacuum pump. As the pressure is reduced within the bellows, the leaf spring raises the valve disk off of the valve seat, the pressure switch being set for such a low value that the disk is raised even though there is an absolute vacuum outside of the bellows. As the pressure within the bellows is further reduced, for example, to about 5 millimeters of mercury, the pressure switch 162 closes and energizes the solenoid windings 148A and 150A of valves 148 and 150, respectively. This permits air to be vented from the cylinder on the side of the piston remote from the valve and for air to be admitted under pressure to the cylinder on the side of the piston nearer the valve. The piston rod, thrust plate and valve disk slide to the left (as viewed in Fig. 2 and Fig. 5), the first rollers 68 being pulled out of their respective recesses and providing a rolling support for the thrust plate. Limit switch L opens and valve 157 closes. A wide-open, straight-through passage between the first and second conduits is available when the piston has reached its extreme position to the left (as viewed in Fig. 2 and Fig. 5).

To close the valve, the operating switch 166 is actuated, either manually or automatically, to interrupt the supply of power to each of the solenoid valve windings 148A, 150A and 160A so that each of the valves 148, 150 and 160 return to the respective positions shown in Fig. 5. The piston, piston rod and thrust plate are moved to the right (as viewed in Fig. 2) until the piston stops and the thrust plate is in the position shown in Fig. 2. Limit switch L is closed by contact from the thrust plate and valve 157 opens permitting air to expand the bellows and close the valve. Pressure switch 162 opens and the condition of the system is again as shown in Figs. 5 and 6.

Thus, this invention provides a gate valve which can be opened and closed automatically and without sliding the valve disk on the valve seat.

I claim:

1. A vacuum valve comprising a body having a first opening and a second opening, a valve seat formed around the first opening, a member disposed within the body and adapted to be moved laterally toward or away from the valve seat, a valve disk, means for movably sealing the valve disk to the member to enclose a chamber between the member and disk and to permit the disk to be moved transversely of the direction of member movement, means for moving the member toward or away from the valve seat, means under the control of said last named means for selectively applying pressure to the chamber only when the member is over the valve seat to move the valve disk toward the valve seat and away from the member whereby the valve disk will seal the first opening in response to the application of the fluid pressure to the chamber, means for applying a substantial vacuum to the chamber and maintaining the vacuum in the chamber when the member is laterally removed from over the valve seat, and springing means for urging the disk toward the member and away from the valve seat to move the disk away from the valve seat when the vacuum is applied to the chamber.

2. A vacuum valve comprising a body having a first opening and a second opening, a valve seat formed around the first opening, a member disposed within the body and adapted to be moved toward and away from the valve seat, a valve disk, means for movably sealing the valve disk to the member to enclose a chamber between the member and disk and to permit the disk to be moved transversely of the direction of member movement, a piston connected to the member for moving the member toward and away from the valve seat, a vacuum source for evacuating the chamber, a source of fluid pressure for pressurizing the chamber, a first solenoid-operated valve for controlling the application of vacuum and pressure to the chamber, a second solenoid-operated valve for controlling the supply of fluid pressure to the first solenoid-operated valve, a cylinder in which the piston is disposed, means for applying fluid pressure to either side of the piston, a third solenoid-operated valve for controlling the application of fluid pressure to one side of the piston, a fourth solenoid-operated valve for controlling application of fluid pressure to the other side of the piston, an electric circuit for actuating the solenoid-operated valves, an operating switch in the circuit for controlling the operation of the first, third and fourth solenoid-operated valves to change the pressure in the chamber and move the member toward and away from the valve seat, a limit switch in the circuit to prevent actuation of the second solenoid-operated valve to supply fluid pressure to the chamber until the valve disk is over the valve seat, and a vacuum switch in the circuit for preventing the actuation of the third and fourth solenoid-operated valves to move the member away from the seat until a predetermined pressure is reached in the chamber.

3. A vacuum valve comprising a body having a first opening and a second opening, a valve seat formed around the first opening, a member disposed within the body and adapted to be moved toward and away from the valve seat, a valve disk, means for movably sealing the valve disk to the member to enclose a chamber between the member and disk and to permit the disk to be moved transversely of the direction of member movement, a spring urging the disk toward the member and away from the valve seat, a piston connected to the member for moving the member toward and away from the valve seat, a vacuum source for evacuating the chamber, a source of fluid pressure for pressurizing the chamber, a first solenoid-operated valve for controlling the application of vacuum and pressure to the chamber, a second solenoid-operated valve for controlling the supply of fluid pressure to the first solenoid-operated valve, a cylinder in which the piston is disposed, means for applying fluid pressure to either side of the piston, a third solenoid-operated valve for controlling the application of fluid pressure to one side of the piston, a fourth solenoid-operated valve for controlling application of fluid pressure to the other side of the piston, an electric circuit for actuating the solenoid-operated valves, an operating switch in the circuit for controlling the operation of the first, third and fourth solenoid-operated valves to change the pressure in the chamber and move the member toward and away from the valve seat, a limit switch in the circuit to prevent actuation of the second solenoid-operated valve to supply fluid pressure to the chamber until the valve disk is over the valve seat, and a vacuum switch in the circuit for preventing the actuation of the third and fourth solenoid-operated valves to move the member away from the seat until a predetermined pressure is reached in the chamber.

References Cited in the file of this patent

UNITED STATES PATENTS

| | | |
|---|---|---|
| 715,745 | Bickford | Dec. 16, 1902 |
| 1,592,986 | Martin | July 20, 1926 |
| 1,826,941 | La Mont | Oct. 13, 1931 |
| 2,253,881 | Anderson | Aug. 26, 1941 |
| 2,417,994 | Sheets | Mar. 25, 1947 |

FOREIGN PATENTS

| | | |
|---|---|---|
| 711,187 | Germany | Sept. 26, 1941 |